(12) United States Patent
Park et al.

(10) Patent No.: US 7,268,709 B2
(45) Date of Patent: Sep. 11, 2007

(54) METHOD FOR GENERATING CODEWORD USING REPETITION

(75) Inventors: Sung-Joon Park, Suwon-si (KR); Heung-Jae Im, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/295,119

(22) Filed: Dec. 6, 2005

(65) Prior Publication Data

US 2006/0120482 A1  Jun. 8, 2006

(30) Foreign Application Priority Data

Dec. 6, 2004  (KR) .................... 10-2004-0102031

(51) Int. Cl.
*H03M 7/00* (2006.01)
(52) U.S. Cl. ........................ 341/81; 375/260
(58) Field of Classification Search ................ 341/81; 375/267, 260; 714/790; 370/335, 342
See application file for complete search history.

(56) References Cited

U.S. PATENT DOCUMENTS

| 2003/0081576 A1* | 5/2003 | Kim et al. .................. 370/335 |
| 2006/0083326 A1* | 4/2006 | Roh et al. .................. 375/260 |
| 2006/0104379 A1* | 5/2006 | Li et al. ..................... 375/267 |

* cited by examiner

*Primary Examiner*—Rexford Barnie
*Assistant Examiner*—Joseph Lauture
(74) *Attorney, Agent, or Firm*—The Farrell Law Firm (57) ABSTRACT

Disclosed is a method for generating codewords through a repetition having a number of repetitions by means of multiple code symbols generated by a mother code and included in a slot. The method including the steps of generating the code symbols through a channel coding for input information symbols, and mapping the code symbols so that copies generated by the repetition are located within a bit sequence in an order different from an order of the code symbols in a bit sequence before the repetition, and performing the repetition.

9 Claims, 6 Drawing Sheets

METHOD FOR GENERATING CODEWORD USING REPETITION

This application claims priority to an application entitled "Method for Generating Codeword Using Repetition" filed in the Korean Intellectual Property Office on Dec. 6, 2004 and assigned Serial No. 2004-102031, the contents of which are incorporated herein by reference.

BACKGROUND OF THE INVENTION

1. Field of the Invention

The present invention relates to a channel coding in a wireless mobile communication system, and more particularly to a method for generating codewords, which can improve decoding performance without increasing complexity.

2. Description of the Related Art

Research is actively being performed to allow the $4^{th}$ generation (4G) mobile communication system to provide users with services having various levels of Quality of Service (QoS) at a high speed of about 100 Mbps. The 4G communication system targets high-speed and high-capacity communication capable of processing and transmitting various information such as images and wireless data in addition to an existing voice-based service. Accordingly, it is important to select a suitable channel coding scheme.

In contrast to wired channel environments, wireless channel environments in a mobile communication system suffer from various factors such as multi-path interference, shadowing, electric wave attenuation, time-varying noise, interference and fading. Therefore, signals transmitted from a transmission unit may include errors while passing through wireless channel environments. These errors may detrimentally affect the entire performance of the mobile communication system. Accordingly, it is necessary to use an error correcting code.

Typically, according to an error correcting code in a Code Division Multiple Access (CDMA) mobile communication system, a transmission side codes information bits and transmits coded codewords to a reception side, which receives the codewords transmitted from the transmission side, decodes the received codewords by using a decoding scheme corresponding to the coding scheme applied by the transmission side and restores the original information bits.

Figure 1:
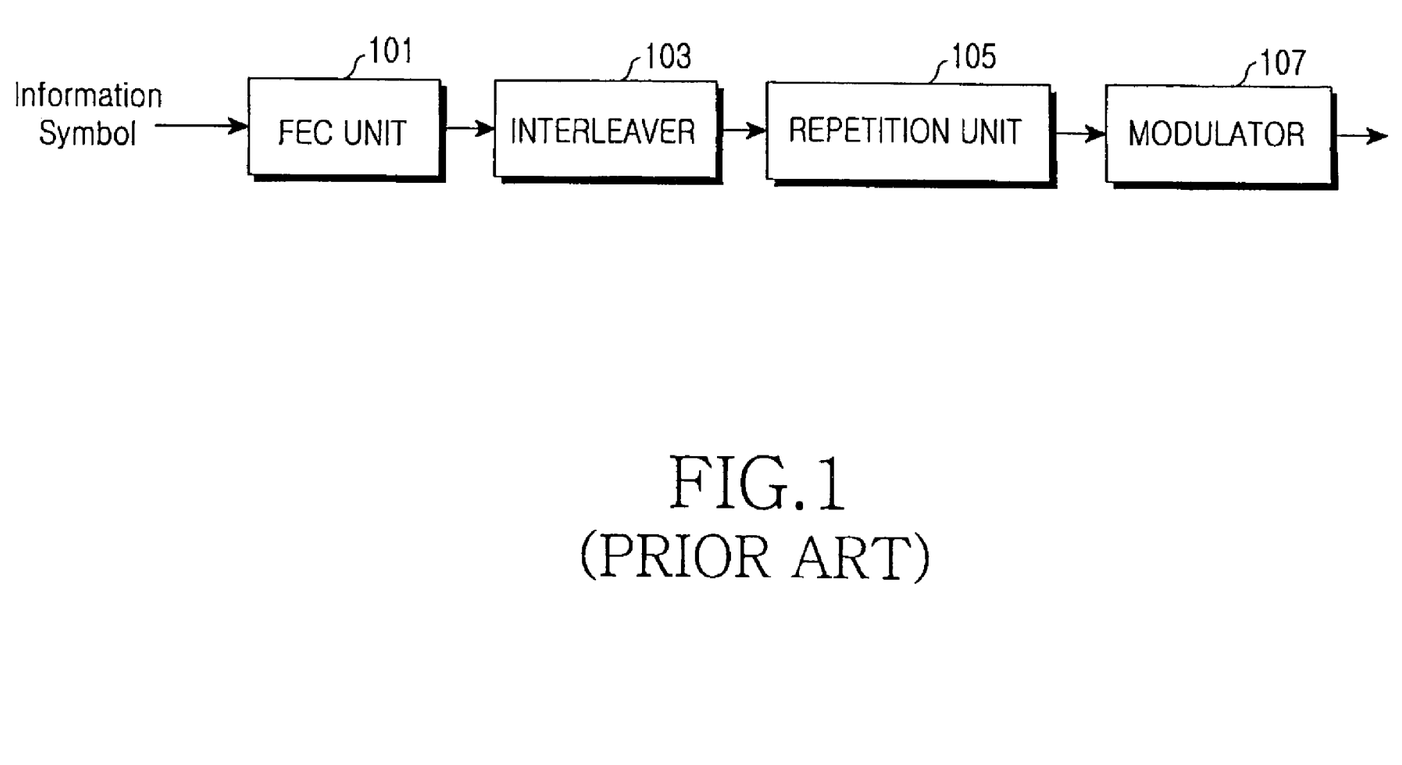
FIG. 1 is a block diagram schematically illustrating the structure of a system for describing a channel coding scheme and a repetition scheme in a known IEEE 802.16 communication system.

FIG. 1 is a block diagram schematically illustrating the structure of a known system for describing a channel coding scheme and a repetition scheme. The system includes a Forward Error Correction (FEC) unit 101, an interleaver 103, a repetition unit 105 and a modulator 107.

The FEC unit 101 receives information symbols and outputs code symbols. The code symbols are interleaved by the interleaver 103 and output to the repetition unit 105. The repetition unit 105 receives the interleaved bits, repeats the input bits by the number of times preset by the slot, and outputs predetermined information bits to the modulator 107. The modulator 107 modulates the received information bits by a predetermined modulation scheme and outputs the modulated bits.

The slot represents a bundle of code symbols included in each sub-channel. For example, when a repetition is implemented by the sub-channel and a Quadrature Phase Shift Keying (QPSK) modulation scheme is used with 48 sub-carriers per sub-channel, 96 code symbols are included in each slot. Further, when a 16 Quadrature Amplitude Modulation (QAM) is used as a modulation scheme, 192 code symbols are included in each slot.

Hereinafter, the conventional repetition scheme will be described with reference to FIGS. 2 and 3.

Figure 2:
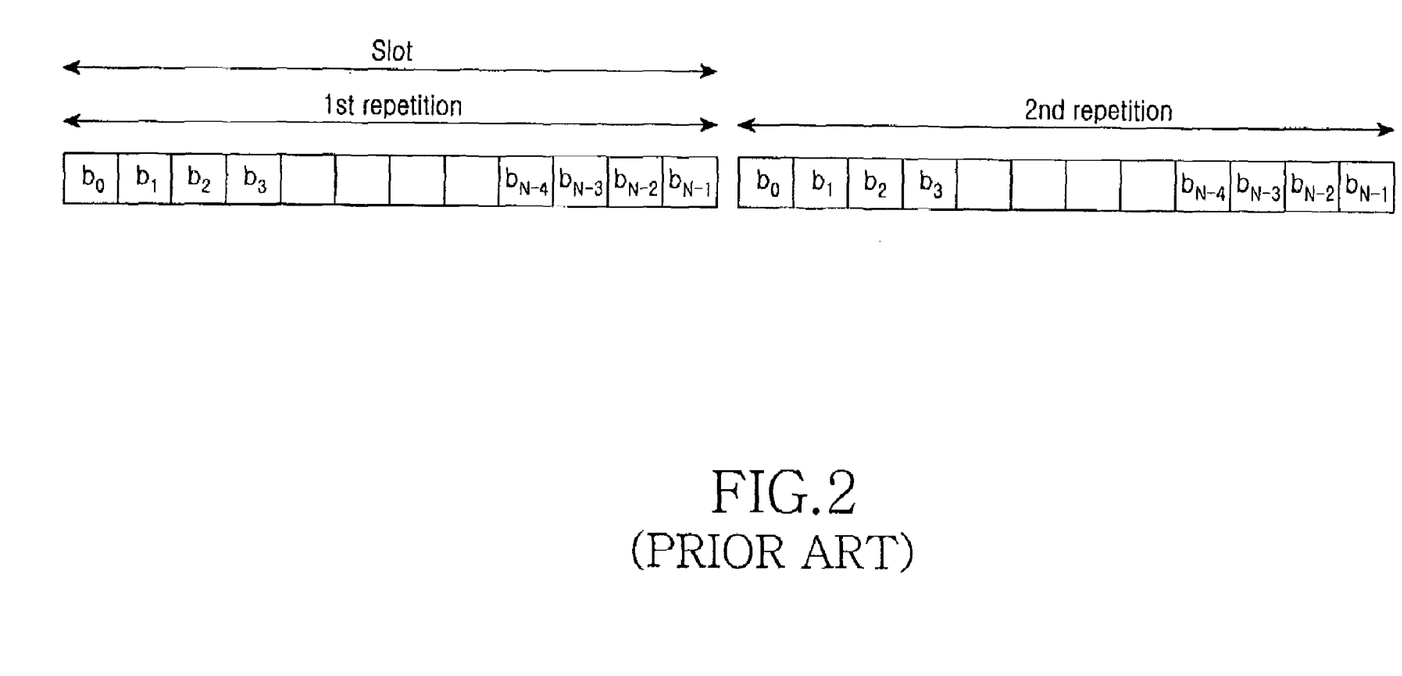
FIG. 2 is a diagram illustrating a known repetition scheme.

FIG. 2 is a diagram illustrating the general repetition scheme, which shows the conventional repetition scheme when the number of repetitions is 2 and a repetition is sequentially implemented.

Referring to FIG. 2, each reference letter, e.g. $b_0, b_1, \ldots, b_{N-2}$ or $b_{N-1}$, represents an index corresponding to a code symbol. One slot includes the code symbols. The number of code symbols included in each slot may change according to modulation scheme. For example, when a QPSK modulation scheme is used, 96 code symbols may be included in each slot. Further, when a 16 QAM modulation scheme is used, 192 code symbols may be included in each slot.

The error correcting code output from the FEC unit 101 in FIG. 1 is referred to as a mother code. A codeword generated by the mother code is divided into the code symbols in each slot as described above. The code symbols are repeated by the slot. Herein, the repetition scheme used in FIG. 2 is a sequential repetition scheme. Accordingly, it can be understood that the code symbols after the first and second repetitions have the same order. Further, a constellation point of a modulation symbol determined by the code symbols is constant regardless of the number of repetitions. Hereinafter, asterisks formed by modulation symbols based on the number of sequential repetitions in FIG. 2 will be described with reference to FIG. 3.

Figure 3:
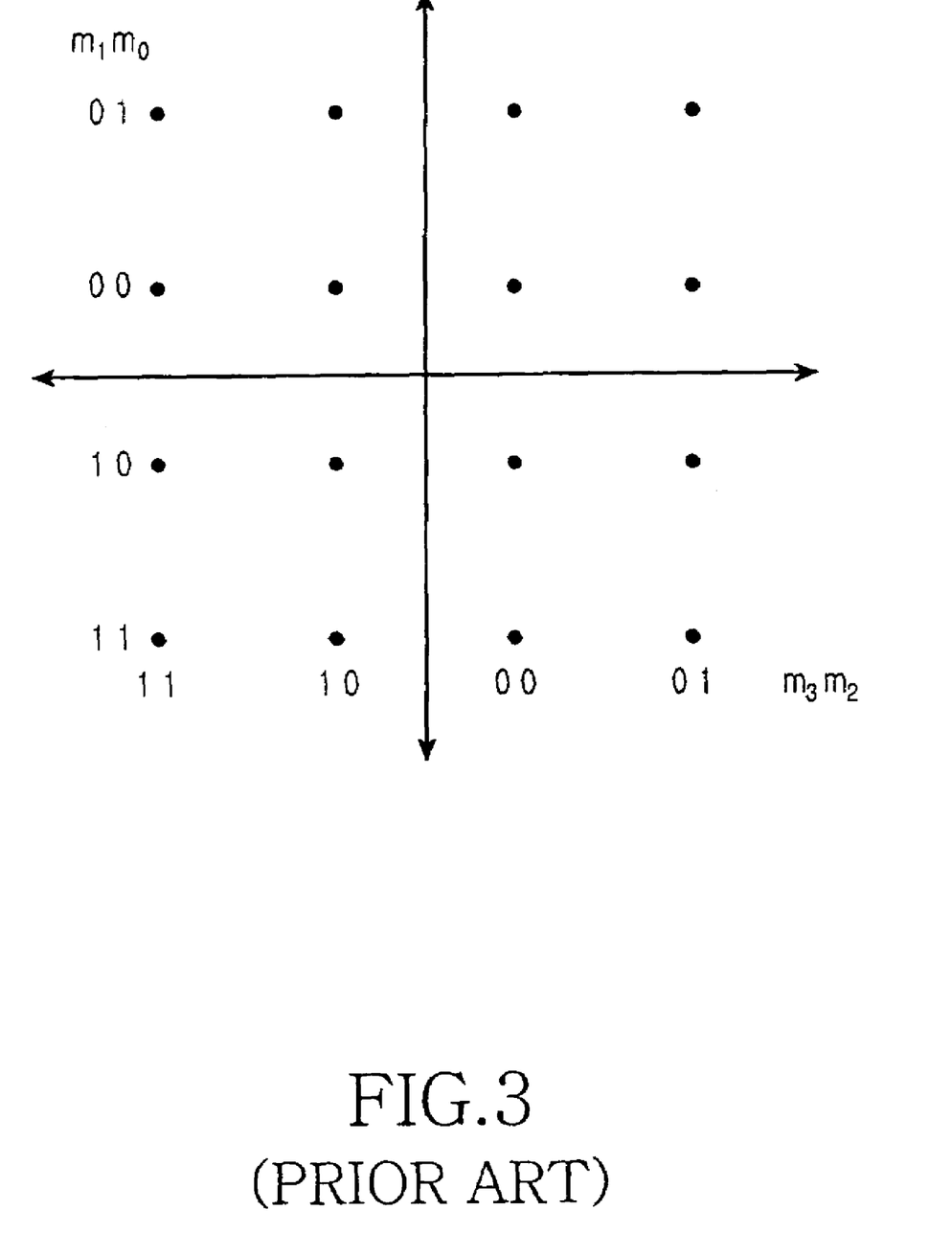
FIG. 3 is a diagram for describing a constellation design method through a known modulation scheme.

FIG. 3 is a diagram for describing a constellation design method through a general modulation scheme, which shows a constellation for a 16 QAM modulation scheme.

Referring to FIG. 3, reference numerals represent binary bits constituting one modulation symbol. Herein, four binary bits have the Bit Error Rates (BERs) as expressed by Equations 1 and 2 below, according to the sequence. The modulation symbol represents a symbol generated by the modulator 107, and one complex modulation symbol includes one or more binary bits according to the modulation scheme.

The input binary bit sequences of the modulator 107 are divided by four bits, and are mapped to locations of $m_3, m_2, m_1$ and $m_0$ in order to form each modulation symbol. That is, when the binary bit sequences in FIG. 2 are input to the modulator 107, $b_0$ is mapped to the location of $m_3$, $b_1$ is mapped to the location of $m_2$, $b_2$ is mapped to the location of $m_1$ and $b_3$ is mapped to the location of $m_0$ in order to form one modulation symbol. Further, in the continuous bit sequence, $b_4$ is mapped to the location of $m_3$, $b_5$ is mapped to the location of $m_2$, $b_6$ is mapped to the location of $m_1$ and $b_7$ is mapped to the location of $m_0$ in order to form the next modulation symbol. Herein, the BERs of $m_0$ and $m_2$ may be expressed by Equation 1.

$$P_{m2} = P_{m0} = Q\left\{\sqrt{\frac{E_s}{5N_0}}\right\} \qquad (1)$$

In Equation 1, $P_{m2}$ and $P_{m0}$ represent the BERs of $m_0$ and $m_2$ constituting the modulation symbol, respectively, Q represents a complementary cumulative density function of a Gaussian probability variable, $E_s$ represents symbol energy and $N_0$ represents noise power density. The BERs of $m_1$ and $m_3$ may be expressed by Equation 2.

$$P_{m3} = P_{m1} = \frac{1}{2}\left[Q\left\{\sqrt{\frac{E_s}{5N_0}}\right\} + Q\left\{3\sqrt{\frac{E_s}{5N_0}}\right\}\right] \qquad (2)$$

In Equation 2, $P_{m3}$ and $P_{m1}$ represent the BERs of $m_3$ and $m_1$ constituting the modulation symbol, respectively, Q represents a complementary cumulative density function of a Gaussian probability variable, $E_s$ represents symbol energy and $N_0$ represents noise power density.

As expressed by Equations 1 and 2, the bits constituting the modulation symbol may have different BERs according to the sequence.

In the meantime, when x>y>0, Q [x]<Q [y]. Accordingly, Equation 1 always has a value larger than that of Equation 2. In FIG. 3, the input bits mapped to the locations of $m_2$ and $m_0$ correspond to an inferior symbol having a high BER, and the input bits mapped to the locations of $m_3$ and $m_1$ correspond to a superior symbol having a low BER. In the input bit sequence ($b_0$, $b_1$, $b_2$, $b_3$ . . . ) of the modulator 107, a superior symbol and an inferior symbol are sequentially repeated.

In the repetition scheme according to the prior art as described above, after the repetition is implemented, the code symbols are mapped within each slot in the same sequence. Therefore, with the increase or decrease of the number of repetitions, the superior symbol becomes more superior and the inferior symbol becomes more inferior. This shows a gradual increase in a reliability disparity between the inferior symbol and the superior symbol, resulting in a deterioration in decoding performance.

SUMMARY OF THE INVENTION

Accordingly, the present invention has been made to solve the above-mentioned problems occurring in the prior art, and it is an object of the present invention to provide a method for generating codewords based on a repetition, which repeats code symbols generated by a mother code in a wireless mobile communication system, thereby improving decoding performance without increasing complexity.

It is another object of the present invention to provide a method for mapping copies of code symbols to different locations by controlling a repetition scheme for the code symbols generated by a mother code when the copies of the code symbols are mapped into a modulation symbol.

It is further another object of the present invention to provide a method for generating codewords based on a repetition, which causes copies of code symbols to have different locations according to the control of a repetition scheme for the code symbols, thereby allowing a reception side to have the same reliability for each code symbol and improving decoding performance.

In order to accomplish the aforementioned objects, according to one aspect of the present, there is provided a method for generating codewords through a repetition having a predetermined number of repetitions by means of multiple code symbols generated by a mother code and included in one slot, the method including the steps of: generating the code symbols through a channel coding for input information symbols, and mapping the code symbols so that copies generated by the repetition are located within a bit sequence in an order different from an order of the code symbols in a bit sequence before the repetition, and performing the repetition.

According to the method, the code symbols are divided by each slot and are sequentially cyclic-shifted according to a function of the number of repetitions. The code symbols in each slot are divided into code symbols constituting each modulation symbol, which are sequentially cyclic-shifted according to a function of the number of repetitions. The code symbols are divided by each slot, and are mapped to have different repetition sequences according to a change in a function of the number of repetitions.

The code symbols in each slot are divided into code symbols constituting each modulation symbol, which are mapped to have different repetition sequences according to a change in a function of the—number of repetitions.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted for sake of clarity.

Typically, information to and from a wireless mobile communication system incurs substantial interference since it is transmitted through a wireless channel. This can lead to a transmission failure. Accordingly, various schemes for improving the reliability of transmission signals have been researched. For example, a scheme using channel codes is used in order to improve the reliability of transmission signals. According to the channel code scheme, a transmission unit generates and transmits an extra parity symbol in addition to an information symbol, and a reception unit decodes the transmitted parity symbol, thereby improving the reception performance for the information symbol.

Typically, a mother code of the channel code has a proper coding rate in consideration of complexity. This is for acquiring a desired coding rate by repeating code symbols generated from the mother code by the specific number of repetitions when it is necessary to provide the high error correction capability or to operate a system at a low Signal-to-Noise Ratio (SNR). Accordingly, the present invention proposes a method for repeating code symbols, which are generated from the mother code, by the slot or by the modulation symbol so that the code symbols can have the same reliability. Consequently, the present invention can improve decoding performance without increasing complexity, in contrast with the conventional scheme.

The present invention relates to a repetition control method. Specifically, the present invention proposes a repetition control scheme in a repetition block in which copies of code symbols generated through a repetition always have different locations when the copies are mapped to a bit sequence for forming a constellation point of a modulation symbol. To achieve this, the present invention includes the steps of generating code symbols through a channel coding for input information symbols, mapping the code symbols so that copies generated by a repetition are located in a bit sequence in an order different from that of the code symbols in a bit sequence before the repetition; and performing the repetition.

The present invention can be applied to all communication systems. However, a description based on an IEEE 802.16 communication system will be given for sake of convenience.

FIGS. 4A to 4D are diagrams illustrating embodiments of a repetition scheme according to the present invention. It is assumed that a repetition is implemented twice and a 16 Quadrature Amplitude Modulation (QAM) modulation scheme is used. However, the present invention can be applied even when a repetition is implemented more than twice and various modulation schemes are used.

Figure 4A:
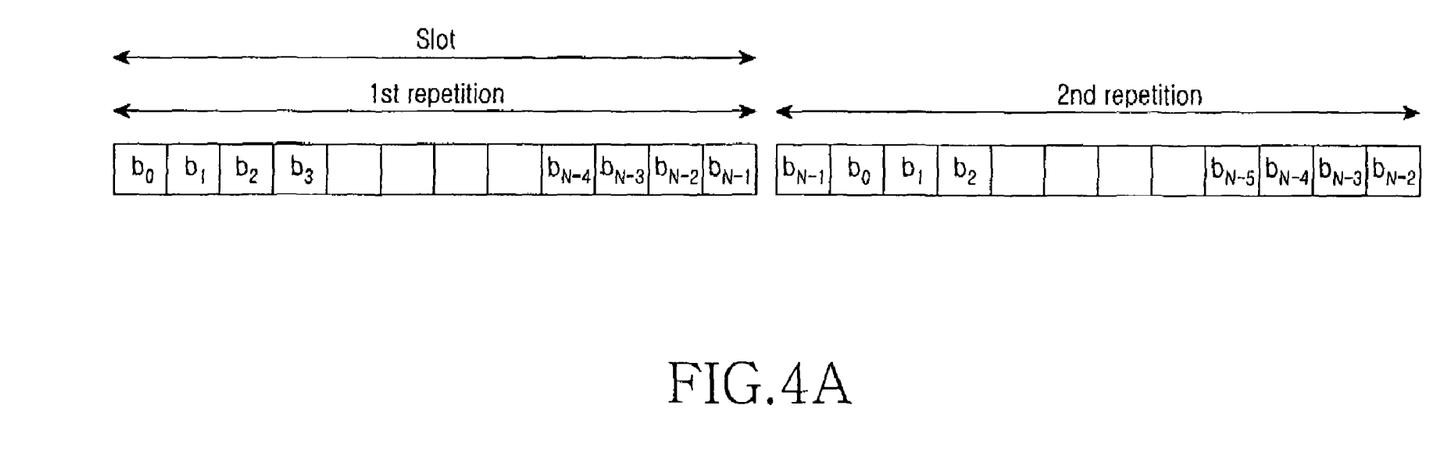
FIGS. 4A to 4D are diagrams illustrating embodiments of a repetition scheme according to the present invention.

As illustrated in FIG. 4A, in a repetition method based on a first embodiment of the present invention, code symbols are mapped within each slot through a cyclic shift scheme by the number of repetitions based on a system setup. When the cyclic shift scheme is used, the code symbols may be shifted to the left or right.

Referring to FIG. 4A, when the code symbol corresponding to $b_0$, $b_2$, . . . , or $b_{N-2}$ represents a superior symbol having a low BER and the code symbol corresponding to $b_1$, $b_3$, . . . , or $b_{N-1}$ represents an inferior symbol having a high BER, each of the code symbols is mapped while sequentially shifting from the current location to the next location or the previous location according to the shift repetition. Accordingly, in the repetition based on the cyclic shift scheme, the inferior symbol and the superior symbol have different locations according to the repetitions, respectively. For example, as the superior symbols $b_0$ and $b_2$ are shifted to the left, the superior symbols are mapped to inferior symbols, respectively. Similarly, as the inferior symbols $b_1$ and $b_3$ are shifted to the left, the inferior symbols are mapped to superior symbols, respectively. As described above, because the code symbols are mapped to alternating inferior symbols and superior symbols by turns according to the number of repetitions, all code symbols have the same reliability after the repetitions.

Figure 4B:
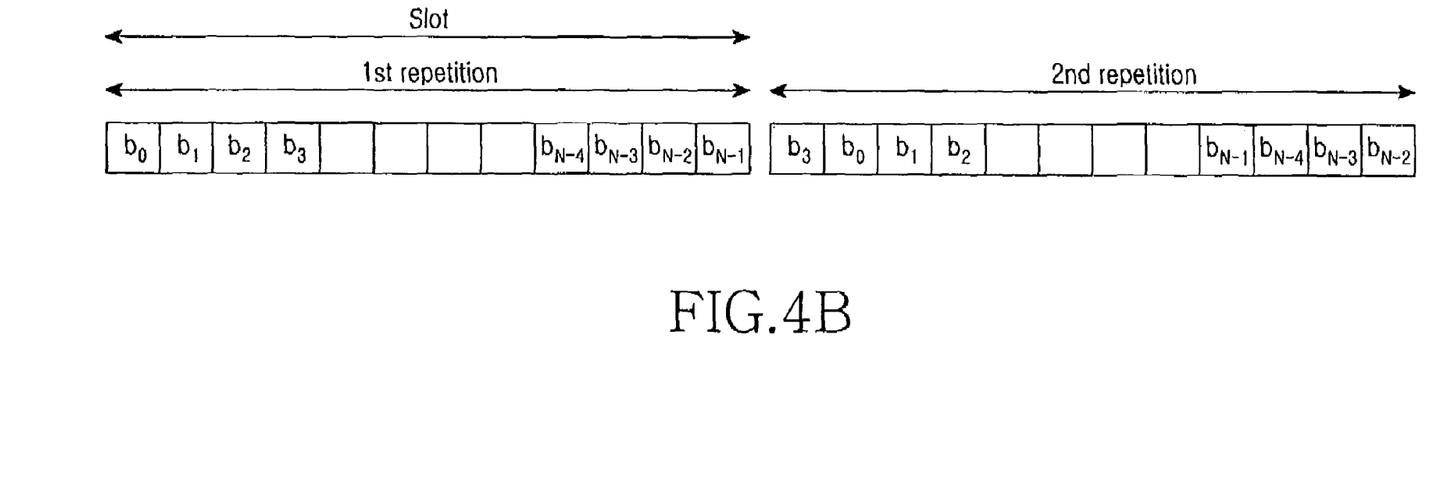

As illustrated in FIG. 4B, in a repetition method based on a second embodiment of the present invention, code symbols are mapped within each slot through a cyclic shift scheme in a unit of a modulation symbol by the number of repetitions based on a system setup. That is, the original code symbol sequence is divided into code symbol sequences corresponding to each modulation symbol, which code symbol sequence is shifted for mapping. When the cyclic shift scheme in the unit of the modulation symbol is used, the code symbols may be shifted to the left or right. Accordingly, four code symbols constituting the modulation symbol are mapped while shifting to inferior symbols and superior symbols according to the number of repetitions.

Referring to FIG. 4B, four code symbols constitute the modulation symbol, i.e. the code symbols are located in $b_0$, $b_1$, $b_2$, and $b_3$, respectively. When the code symbols corresponding to $b_0$ and $b_2$ represent superior symbols with a low BER and the code symbols corresponding to $b_1$ and $b_3$ represent inferior symbols with a high BER, each of the code symbols in the modulation symbol is mapped while sequentially shifting from the current location to the next location or the previous location. Accordingly, the inferior symbol or the superior symbol have different locations according to the repetitions. For example, as the superior symbols $b_0$ and $b_2$ are shifted to the left the superior symbols are mapped to inferior symbols, respectively. Similarly, as the inferior symbols $b_1$ and $b_3$ are shifted to the left, the inferior symbols are mapped to superior symbols, respectively. Since the code symbols are mapped to alternating inferior symbols or superior symbols by turns according to the number of repetitions, all code symbols have the same reliability after the repetitions.

Figure 4C:
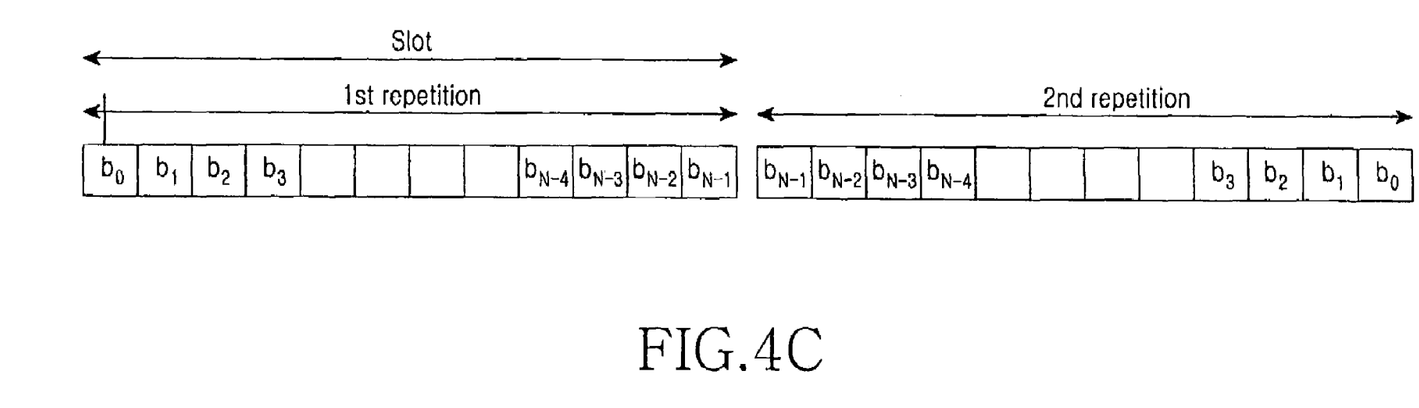

As illustrated in FIG. 4C, in a repetition method based on a third embodiment of the present invention, code symbols are mapped within each slot by the number of repetitions based on a system setup. That is, the code symbols are mapped according to a repetition in odd or even sequences. That is, when the number of repetitions is even (or odd), the code symbols are mapped in the original sequence. However, when the number of repetitions is odd (or even), the code symbols are mapped in a sequence inverse to the original sequence.

Referring to FIG. 4C, it is assumed that the code symbol corresponding to $b_0$, $b_2$, . . . , or $b_{N-2}$ represents a superior symbol having a low BER and the code symbol corresponding to $b_1$, $b_3$, . . . , or $b_{N-1}$ represents an inferior symbol having a high BER. Herein, when the number of repetitions is odd, i.e. when the first repetition is implemented, the code symbols are mapped in the original sequence of $b_0$, $b_1$, $b_2$, $b_3$, . . . , $b_{N-1}$. However, when the number of repetitions is even, i.e. when the second repetition is implemented, the code symbols are mapped in an inverse sequence of $b_{N-1}$, $b_{N-2}$, $b_{N-3}$, $b_{N-4}$, . . . , $b_3$, $b_2$, $b_1$, $b_0$. As described above, since locations of copies of the code symbols generated by the first repetition and the second repetition are altered between superior symbols and inferior symbols in each repetition, all code symbols have the same reliability after the repetitions.

Figure 4D:
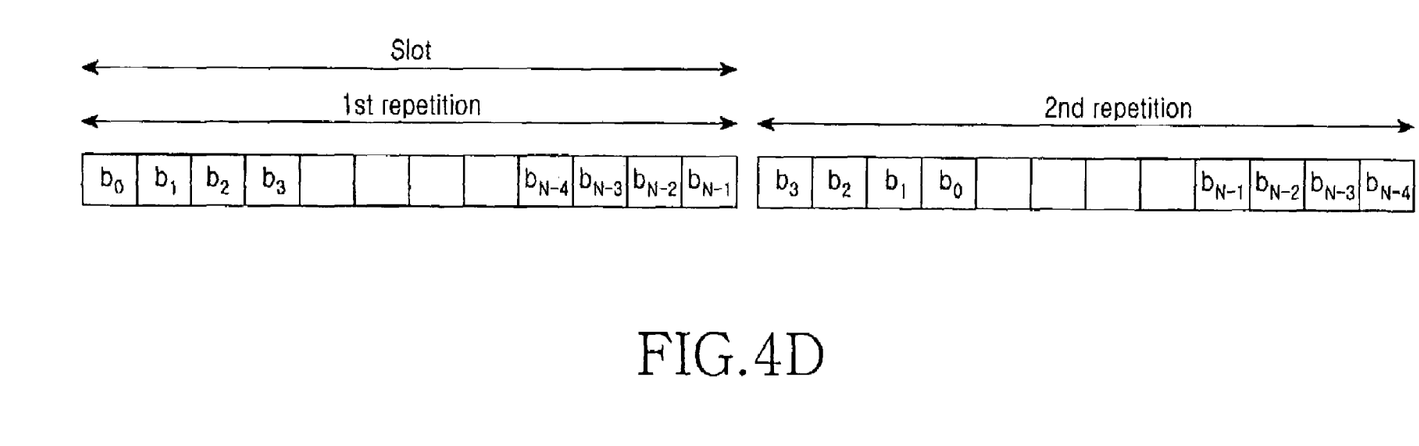

As illustrated in FIG. 4D, in a repetition method based on a fourth embodiment of the present invention, code symbols are mapped within each slot in a unit of a modulation symbol by the number of repetitions based on a system setup. That is, the code symbols are mapped according to a repetition in odd or even sequences. In this repetition method, the original code symbol sequence is divided into code symbol sequences corresponding to each modulation symbol. Then, when the number of repetitions is even, the code symbols are mapped in the original sequence. However, when the number of repetitions is odd, the code symbols are mapped in a sequence inverse to the original sequence.

Referring to FIG. 4D, four code symbols constitute the modulation symbol, i.e. the code symbols are located in $b_0$, $b_1$, $b_2$, and $b_3$, respectively. It is assumed that the code symbols corresponding to $b_0$ and $b_2$ represent superior symbols with a low BER and the code symbols corresponding to $b_1$ and $b_3$ represent inferior symbols with a high BER. Herein, when the number of repetitions is odd, i.e. when the first repetition is implemented, the code symbols are mapped in the original sequence of $b_0$, $b_1$, $b_2$, $b_3$, . . . , $b_{N-4}$, $b_{N-3}$, $b_{N-2}$, $b_{N-1}$. However, when the number of repetitions is even, i.e. when the second repetition is implemented, the code symbols are mapped in an inverse sequence in a unit of the modulation symbol. In other words, the mapping is implemented in a unit of four code symbols constituting the modulation symbol. As described above, since copies of the code symbols generated by the first repetition and the second repetition are mapped to different locations within a bit sequence including the modulation symbol in a unit of code symbols constituting the modulation symbol, all code symbols have the same reliability after the repetition.

Hereinafter, the embodiments of the present invention as described above will be described through a comparison of performance for a packet error with the prior art with reference to FIG. 5.

Figure 5:
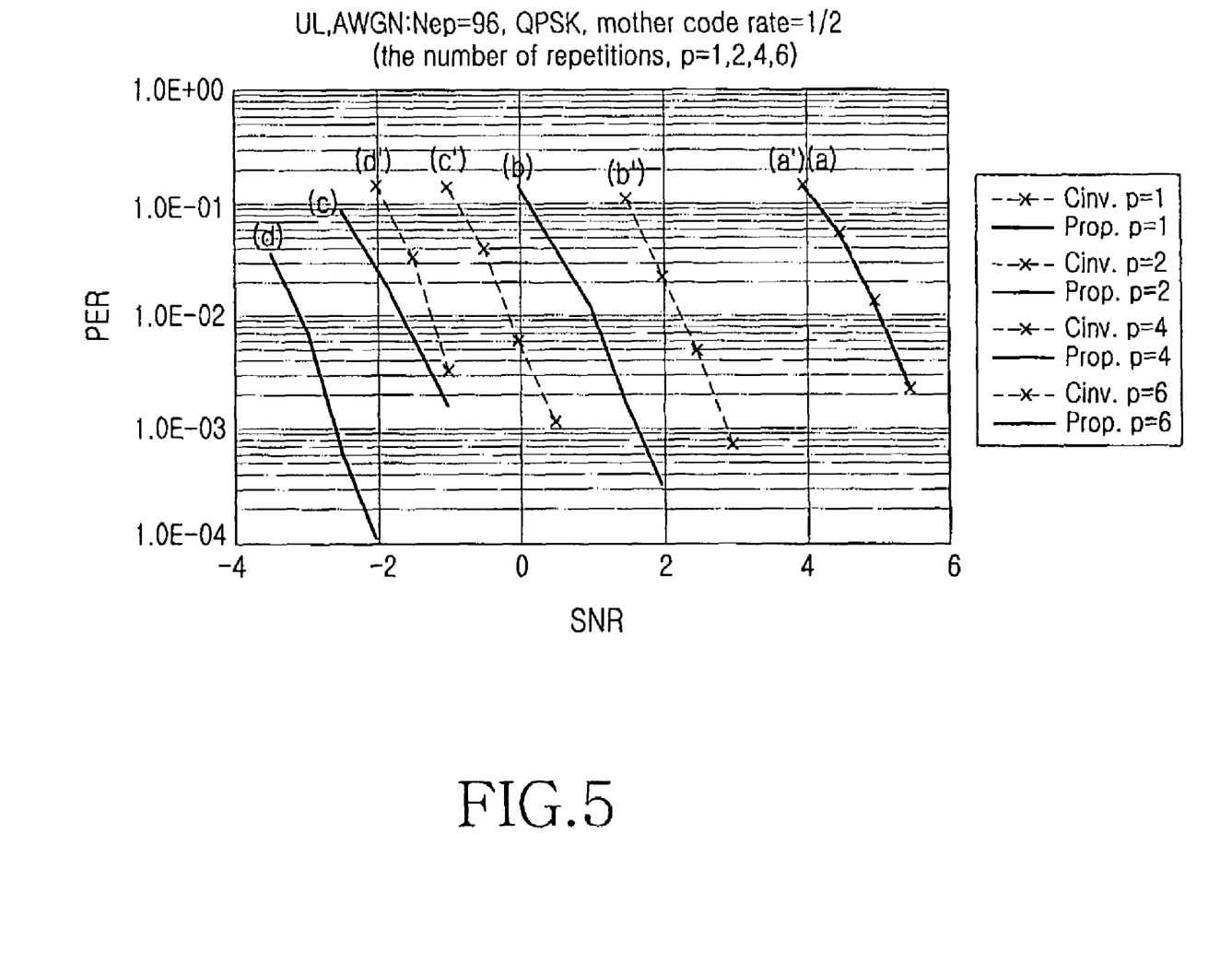
FIG. 5 is a graph illustrating performance based on the number of repetitions according to an embodiment of the present invention.

FIG. 5 shows a graph illustrating results based on a 16 QAM modulation scheme on an assumption that the number P of repetitions is 1, 2, 4 and 6 when an encoder packet (input of an FEC unit) has a size (Nep) of 96 and a mother code rate is ½ in Additive White Gaussian Noise (AWGN) environments.

As illustrated in FIG. 5, in the repetition method according to the prior art, a difference between a superior symbol and an inferior symbol increases as the number P of repetitions increases. However, in the repetition method according to the present invention, the decoding performance is improved as the number P of repetitions increases. For example, when the number P of repetitions is 2, the decoding performance is improved by about 1.4 dB. When the number P of repetitions is 4, the decoding performance is improved by about 1.5 dB. When the number P of repetitions is 6, the decoding performance is improved by about 2.0 dB. When the number P of repetitions is 6, when a target Packet Error Rate (PER) is fixed to $10^{-2}$, the conventional method needs an SNR of −1.2 dB, but the present invention needs an SNR of −3.2 dB. Accordingly, the present invention improves the decoding performance by 2.0 dB in the corresponding conditions as compared with the conventional method.

FIG. 5 shows the decoding performance when the 16 QAM modulation scheme is used. Here, the present invention significantly improves the decoding performance because three types (i.e. a superior symbol, an intermediate symbol and an inferior symbol) of BERs exist according to bit sequences constituting a modulation symbol.

In a method for generating codewords based on a repetition according to the present invention as described above, code symbols generated by a mother code are repeated in a wireless mobile communication system, so that decoding performance can improve without increasing complexity. Further, in mapping copies of code symbols generated through a repetition to a bit sequence for forming a constellation point of a modulation symbol, the copies can be mapped to different locations. Furthermore, copies of code symbols are mapped to different locations according to the control of a repetition scheme for code symbols, so that a reception side can have the same reliability for each code symbol and the decoding performance can be improved.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for generating codewords by executing codes stored in a communication system through a repetition having a number of repetitions by means of multiple code symbols generated by a mother code and respectively included in a slot, the method comprising the steps of:

generating the code symbols through a channel coding for inputting information symbols; and mapping the code symbols so that copies generated by the repetition are located within a bit sequence in an order different from an order of the code symbols in a bit sequence prior to the repetition, and performing the repetition.

2. The method as claimed in claim 1, wherein, in the step of mapping the code symbols, the code symbols are divided by the slots, and the code symbols are sequentially cyclic-shifted according to a function of the number of repetitions.

3. The method as claimed in claim 1, wherein, in the step of mapping the code symbols, the code symbols in the slots are respectively divided into code symbols constituting a modulation symbol, and the code symbols in the modulation symbols are sequentially cyclic-shifted according to a function of the number of repetitions.

4. The method as claimed in claim 1, wherein, in the step of mapping the code symbols, the code symbols are divided by the slots, and the code symbols in the slots are mapped to have different repetition sequences according to a change in a function of the number of repetitions.

5. The method as claimed in claim 4, wherein the code symbols in the slots are mapped in an order of an initial code symbol sequence when a function of the number of repetitions is odd, and the code symbols in the slots are mapped in an order inverse to the order of the initial code symbol sequence when the function of the number of repetitions is even.

6. The method as claimed in claim 4, wherein the code symbols in the slots are mapped in an order of an initial code symbol sequence when a function of the number of repetitions is even, and the code symbols in the slots are mapped in an order inverse to the order of the initial code symbol sequence when the function of the number of repetitions is odd.

7. The method as claimed in claim 1, wherein, in the step of mapping the code symbols, the code symbols in the slots are respectively divided into code symbols constituting a modulation symbol, and the code symbols in the modulation symbols are mapped to have different repetition sequences according to change in a function of the predetermined number of repetitions.

8. The method as claimed in claim 7, wherein, when a function of the number of repetitions is odd, the code symbols in the modulation symbols are mapped in an initial code symbol sequence, and when the function of the number of repetitions is even, the initial code symbol sequence is divided into code symbols respectively constituting the modulation symbols and the code symbols are mapped in an order inverse to an order of the initial code symbol sequence.

9. The method as claimed in claim 7, wherein, when a function of the number of repetitions is even, the code symbols in the modulation symbols are mapped in a sequence of an initial code symbol sequence, and when the function of the number of repetitions is odd, the initial code symbol sequence is divided into code symbols constituting the modulation symbols and the code symbols are mapped in an order inverse to a sequence of the initial code symbol sequence.

* * * * *